United States Patent
Bledsoe et al.

(10) Patent No.: US 6,672,526 B1
(45) Date of Patent: Jan. 6, 2004

(54) AUTOMATIC TWO-SPEED TRANSMISSION FOR A FISHING REEL

(75) Inventors: Steven W. Bledsoe, San Clemente, CA (US); Richard Duncan, Aliso Viejo, CA (US)

(73) Assignee: Tiburon Engineering, Inc., Santa Ana, CA (US)

( * ) Notice: Subject to any disclaimer, the term of this patent is extended or adjusted under 35 U.S.C. 154(b) by 1 day.

(21) Appl. No.: 10/190,864

(22) Filed: Jul. 8, 2002

(51) Int. Cl.$^7$ .............................................. A01K 89/015
(52) U.S. Cl. ...................... 242/255; 242/263; 242/264; 242/266
(58) Field of Search ............................ 242/255, 257, 242/259, 260, 263, 264, 266

(56) References Cited

U.S. PATENT DOCUMENTS

| | | | | |
|---|---|---|---|---|
| 3,675,502 A | * | 7/1972 | Sarah | 74/369 |
| 4,193,763 A | * | 3/1980 | Cipolli et al. | 8/532 |
| 4,427,162 A | | 1/1984 | Noda | |
| 4,560,118 A | * | 12/1985 | Weber et al. | 242/255 |
| 4,564,158 A | | 1/1986 | Moosberg et al. | |
| 4,850,550 A | | 7/1989 | Aoki | |
| 5,058,447 A | * | 10/1991 | Ikuta | 74/371 |
| 5,161,750 A | | 11/1992 | Hitomi | |
| 5,454,526 A | * | 10/1995 | Kaneko | 242/255 |
| 5,513,814 A | | 5/1996 | Zanon | |
| 6,102,316 A | * | 8/2000 | Nilsen | 242/255 |
| 6,254,020 B1 | * | 7/2001 | Nilsen | 242/255 |
| 6,325,315 B1 | * | 12/2001 | Chang | 242/255 |
| 6,505,787 B1 | * | 1/2003 | Nilsen | 242/255 |

\* cited by examiner

*Primary Examiner*—Emmanuel Marcelo
(74) *Attorney, Agent, or Firm*—Stetina Bronda Garred & Brucker

(57) ABSTRACT

An automatic two-speed transmission for a fishing reel comprises a spool mounted on a spool shaft, a drive sleeve mounted on a drive shaft disposed parallel to the spool shaft. A low gear driver nonrotatably mounted on the drive shaft engages the low gear when the low gear rotates at a speed less than the drive shaft, the low gear driver disengaging from the low gear when the low gear rotates at a speed greater than the drive shaft. The low gear drives a low pinion gear that turns the spool. A high gear is disposed on the drive sleeve between clutch washers, the clutch washers providing frictional resistance against the high gear in order to engage the high gear, which in turn engages a high pinion gear that turns the spool. A tension preset device selectably adjusts the drive sleeve and the drive shaft axially relative to each other, squeezing the high gear between the clutch washers.

26 Claims, 5 Drawing Sheets

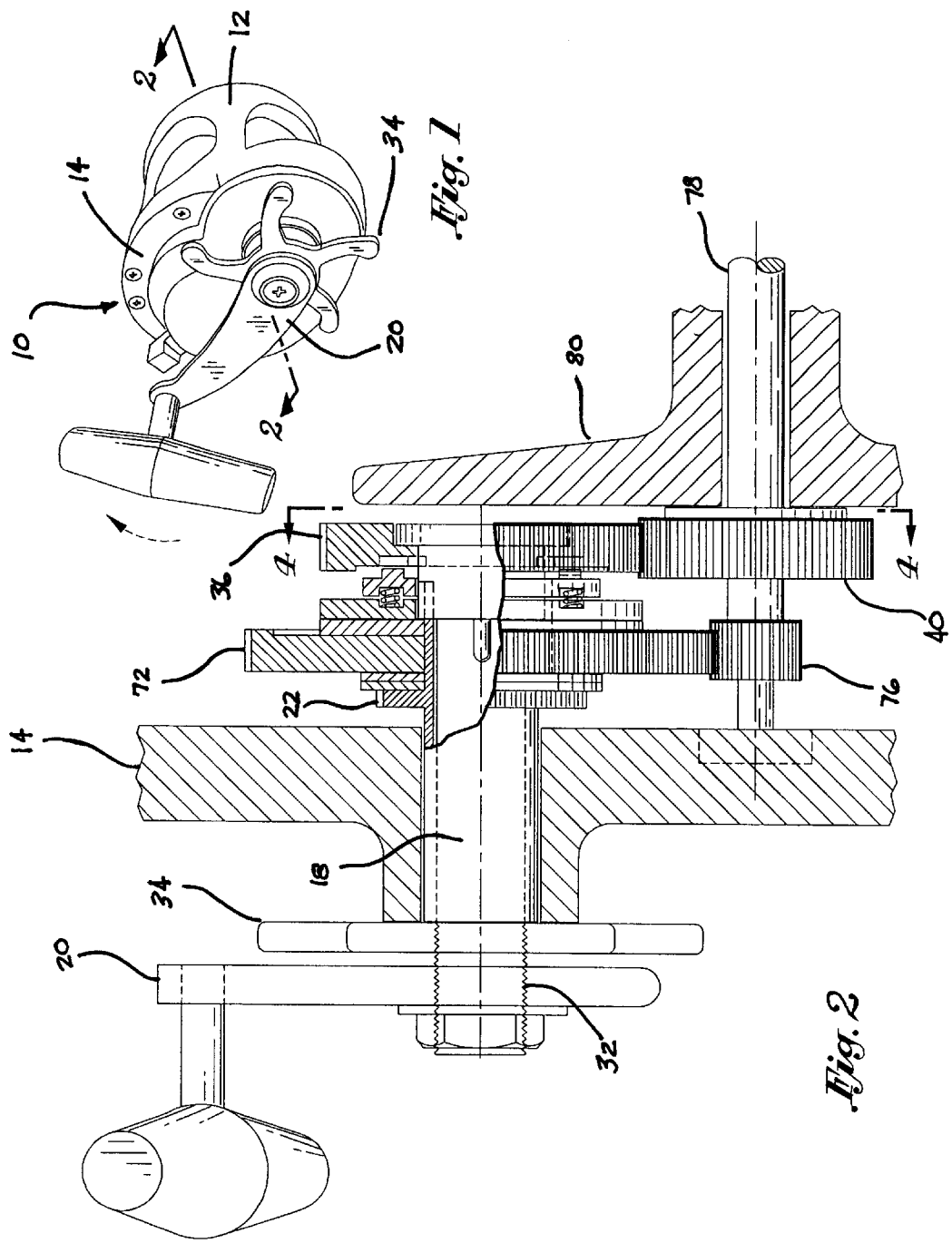

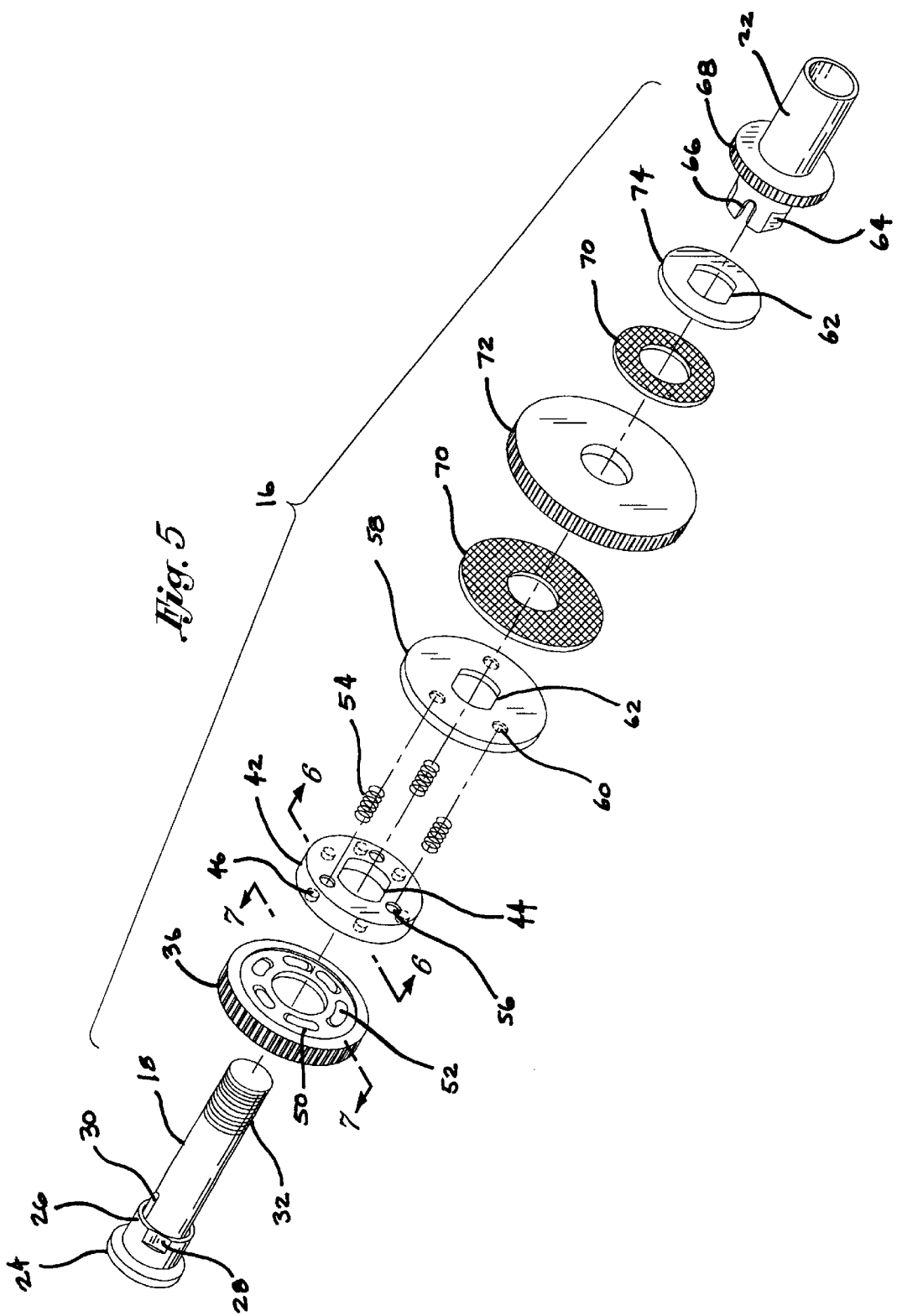

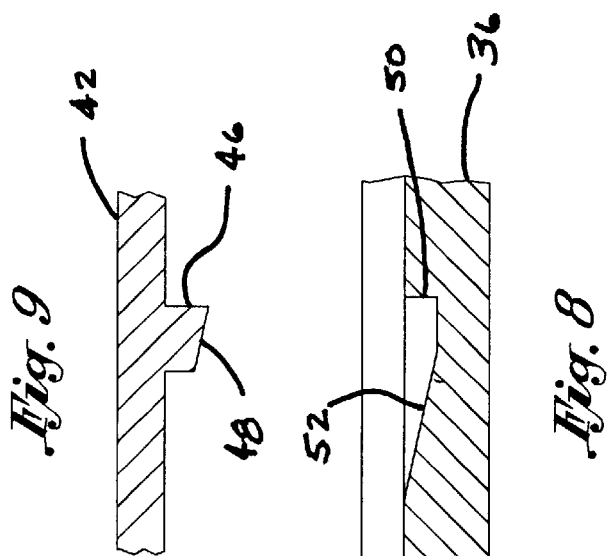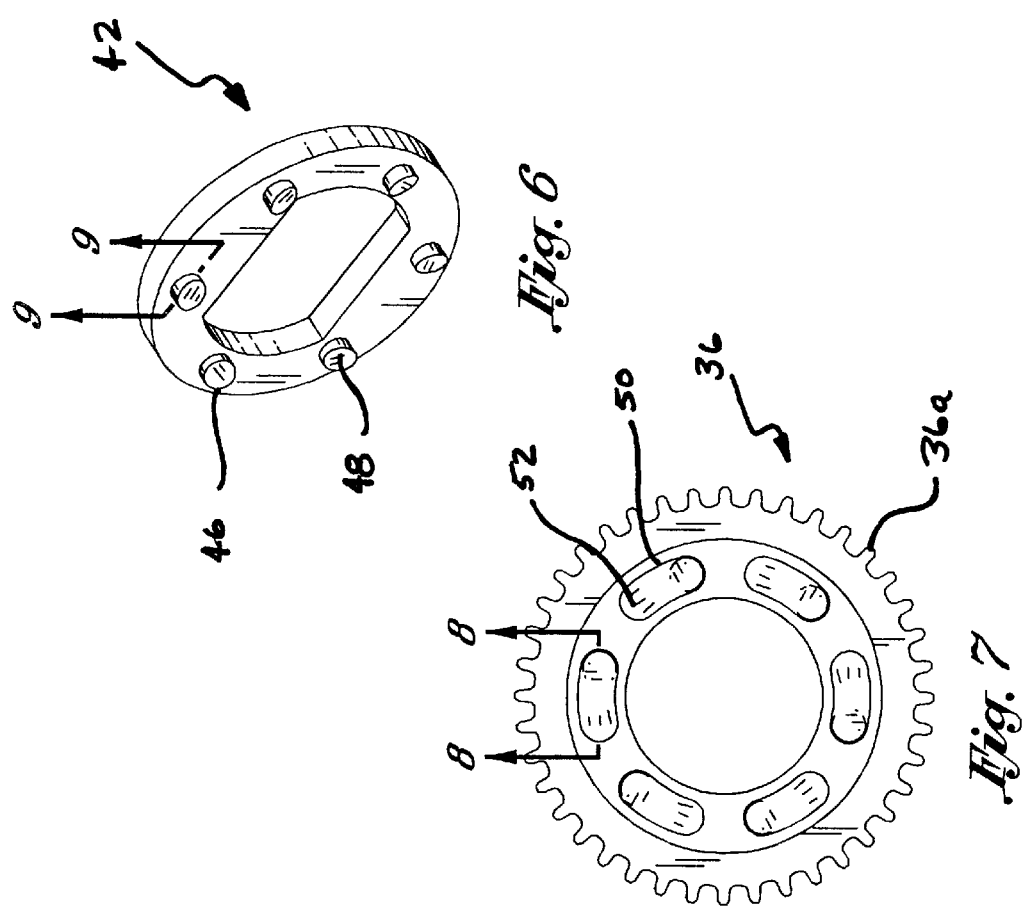

1

AUTOMATIC TWO-SPEED TRANSMISSION FOR A FISHING REEL

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to fishing equipment and, more particularly, to an automatic two-speed transmission for a fishing reel to provide automatic shifting from high speed to low speed and from low speed to high speed.

Big game fishing tackle is characterized by heavy-duty revolving spool reels. Most big game reels today are lever drag reels of either the single speed or two-speed variety. However, despite their increased cost, two-speed lever drag reels account for half of all lever drag reels sold. In fact, reel technicians upgrade some single speed reels to two-speed versions with after-market conversions.

The prior art describes a manual two-speed fishing reel including a low speed gear engageable with a second low speed gear and a high speed gear engageable with a second high speed gear, the second low and high speed gears driving a spool. A shifter transmits the rotation of a handle shaft from the first low gear to the first high gear in order to engage the high gear, and vice versa. However, this arrangement is problematic in that manual shifting is cumbersome because both hands may be occupied in fighting a large fish, with one hand on the rod and the other on the crank handle. Even temporarily removing either hand may lead to the loss of the fish.

The prior art also describes a two-speed fishing reel allowing bi-directional reeling through the use of a cylindrical shaft for transmitting force from a crank handle. The cylindrical shaft is axially slidable and can alternately engage either a low speed gear or a high speed gear upon the manual pushing or pulling of a control button. However, the manually selectable two-speed fishing reel of this configuration has the same drawbacks that are inherent in any manually selectable two-speed fishing reel—namely, the need for the angler to divert attention when fighting a large or powerful fish to manually push or pull a control button to effect a gear change. Manually changing gears, as may be required many times during the course of landing a large and powerful fish, could result in losing the fish if the fishing line slackens during the time that it takes to manually shift gears.

Also included in the prior art is an automatic two-speed drive mechanism. Two driving gears of different diameters are rotatably mounted on a main shaft, the two driving gears meshing with two smaller driven gears. The two driven gears are biased toward each other with springs. Cam surfaces are disposed on the ends of the driven gears facing each other, the cam surfaces disengaging the driven gears and urging them axially away from each other when the smaller driven gear rotates relative to the larger driven gear in one direction. When the larger driven gear rotates relative to the smaller driven gear in this direction, the cams drivingly couple the two driven gears together. Included with the configuration is the ability to set the frictional force on the high gear independent from the frictional force setting of the low gear so that the frictional settings are compatible with the type of lure used and the type of fishing. However, the drawback to the above mechanism is that the construction is complicated with many moving parts and the manufacturing cost is high.

Another automatic two-speed drive mechanism included in the prior art is a planetary gear configuration wherein planetary gears extend from one side of a high speed main drive gear and are engaged by a secondary drive gear. A friction clutch is interposed between a main drive shaft and the main drive gear. When the friction clutch slips, the secondary drive gear, through orbital rotation of the planet gears, drives the main drive gear. As planetary gear systems necessarily involve many parts, the two-speed drive mechanism of this configuration is also complicated and costly.

As can be seen, there is a need for an automatic shifting two-speed lever drag fishing reel that can automatically and rapidly shift from low speed to high speed and vice versa without the need for manual speed selection by the user. Additionally, there is a need for an automatic shifting two-speed lever drag fishing reel wherein the frictional torque is easily adjustable. Furthermore, there is a need for an automatic two-speed transmission for a fishing reel that is low cost and of simple construction with a minimal number of parts.

BRIEF SUMMARY OF THE INVENTION

The present invention specifically addresses and alleviates the above referenced deficiencies associated with the use of the two-speed fishing reels of the prior art. More particularly, the present invention is an improved, automatic two-speed transmission for a fishing reel that will automatically shift into high speed gear ratio when tension on the line is low. As will be demonstrated below, the automatic two-speed transmission of the present invention differs from existing two-speed lever drag fishing reel transmissions in that it does not require manual shifting by the operator to change from a high speed gear ratio to a low speed gear ratio. The automatic two-speed transmission will automatically shift into low speed gear ratio when fishing line tension exceeds a predetermined setting of the tension preset wheel. The tension preset wheel is also easily adjustable for regulating the point at which the transmission shifts from high gear to low gear and from low gear to high gear.

In accordance with a preferred embodiment of the present invention, there is provided an automatic two-speed transmission for a fishing reel that will automatically shift from high speed to low speed and from low speed to high speed. The automatic two-speed transmission of the present invention includes a reel frame side plate connected to a reel frame, the transmission driving a spool rotatably mounted on a spool shaft. The transmission includes a drive shaft that is carried by the reel frame side plate. A crank handle connected to the drive shaft rotates the drive shaft. A drive sleeve is carried on and non-rotatably fixed to the drive shaft.

A low gear, freely rotatable on the drive shaft, drives a low pinion gear with the low pinion gear connected to the spool shaft, the spool shaft disposed parallel to the drive shaft and journaled into the reel side plate. A low gear driver is slidably disposed on the drive shaft. The low gear driver is non-rotatable on the drive sleeve.

In a preferred embodiment of the present invention, the low gear driver includes six posts for engaging a set of arcuate mating cavities on the low gear. Engagement of the gear driver posts with the arcuate mating cavities enables the rotation of the low gear. Also in a preferred embodiment, the arcuate mating cavities of the low gear have ramps allowing the chamfer posts of the gear driver to smoothly disengage from the arcuate mating cavities when the low gear rotates at a speed greater than that of the drive shaft. Optionally, the low gear driver may have only three posts for engaging three arcuate mating cavities in the low gear. However, there are a number of arrangements that can provide the necessary engagement and disengagement characteristics of the low gear driver with the low gear.

The drive sleeve also includes a pair of clutch washers that are held non-rotatable on the drive sleeve. In a preferred embodiment, an anti-reverse gear fixed to the drive sleeve provides bearing support for one of the clutch washers. The anti-reverse gear prevents the transmission from rotating in a rearward direction. The other of the pair of clutch washers is located adjacent the low gear driver.

Interposed between the low gear driver and one of the clutch washers is a set of springs. The biasing force of the springs allows the posts of the low gear driver to engage the arcuate mating grooves of the low gear only when the low gear is rotating slower than the drive shaft while the posts and mating grooves are aligned. Optionally, at least one spring such as a cone spring may be interposed between the low gear driver and the clutch washer concentric to the low gear driver.

A high gear, disposed between the pair of clutch washers and freely rotatable on the drive sleeve, is located adjacent the low gear, the high gear having a diameter greater than that of the low gear. The high gear drives a high pinion gear, the high pinion gear connected to the spool shaft, which as mentioned above, is journaled into the reel side plate and disposed parallel to the drive shaft.

A preferred embodiment of the present invention includes a pair of annular clutch discs mounted on the drive gear on either side of the high gear. The clutch discs provide frictional resistance against the high gear in order to engage the high gear. One of ordinary skill in the art will recognize that an alternate arrangement may also be possible where the annular clutch discs may be omitted altogether. In this scenario, the clutch washers alone are configured to provide frictional resistance for engaging the high gear.

A tension preset device located on the end of the drive shaft provides a selectively adjustable predetermined compression load between the clutch washers and the high gear. In the preferred embodiment, the tension preset device is a tension preset wheel that is threadably attached to the threaded portion of the drive shaft. The tension preset wheel moves the drive sleeve and the drive shaft axially relative to each other in order to squeeze the high gear between the clutch washers.

In operation, when there is no resistance on the fishing line, the clutch discs and/or clutch washers apply frictional force to the high gear so that the high gear is driven frictionally by rotation of the drive shaft. This in turn causes the high pinion gear to rotate the spool in a forward direction to reel in line at a high rate of speed at low resistance. In this condition, the low pinion gear causes the low gear to rotate at a speed greater than that of the drive shaft and low gear driver, prohibiting the low gear driver from engaging the low gear as the posts of the low gear driver rotate and slide past the arcuate mating cavities of the low gear.

When the resistance on the fishing line is greater than the clutch frictional resistance exerted on the high gear by the clutch discs and/or clutch washers, the high gear slips, losing its ability to drive the spool. As the high gear slips, the high and low pinion gears slow down, allowing the drive shaft and low gear driver to match the rotational speed of the low gear. When the rotational speed of the low gear driver matches or exceeds the rotational speed of the low gear, the low gear driver engages the low gear. This in turn drives the low pinion gear and spool of the reel, providing the user with a greater mechanical advantage at the crank handle.

However, in the case where the transmission is in low gear, the resistance to the fishing line may be suddenly reduced, such as if a fish on the line turns and runs toward the user causing the line to slacken. In this condition, the frictional resistance of the clutch discs and/or washers against the high gear is greater than the resistance applied to the fishing line, allowing the high gear to resume driving the high pinion gear. The low gear driver then disengaging from the low gear, allowing the user to again reel in line at a high rate of speed. The above scenario where the transmission automatically shifts from low gear to high gear and back to low gear may be repeated many times during the course of fighting and landing a fish. The tension preset wheel is adjustable to regulate the point at which the transmission assembly shifts from high gear to low gear and from low gear to high gear.

BRIEF DESCRIPTION OF THE DRAWINGS

These as well as other features of the present invention will become more apparent upon reference to the drawings wherein:

FIG. 1 is a perspective view of a lever drag fishing reel which incorporates an automatic two-speed transmission in accordance with an embodiment of the present invention;

FIG. 2 is a fragmentary sectional view taken along line 2—2 of FIG. 1, illustrating the arrangement of the automatic two-speed transmission with the low gear driver disengaged so that the high gear is driving the spool;

FIG. 5 is an exploded perspective view of the automatic two-speed transmission illustrating the connective relationship of the low gear driver to the low gear and the connective relationship of the clutch discs to the high gear in accordance with an embodiment of the present invention;

FIG. 6 is a perspective view taken along line 6—6 of FIG. 5 illustrating the posts of the low gear driver, which are hidden in FIG. 5;

FIG. 7 is a sectional view taken along line 7—7 of FIG. 5 looking axially at the arrangement of the arcuate mating cavities in the low gear;

FIG. 8 is a fragmentary sectional view taken along line 8—8 of FIG. 7 illustrating the ramps of the arcuate mating cavities in the low gear; and FIG. 9 is a fragmentary sectional view taken along line 9—9 of FIG. 8 illustrating the chamfer of the posts of the low gear driver.

DETAILED DESCRIPTION OF THE INVENTION

A preferred embodiment of the present invention will now be described in particular with reference to the accompanying drawings.

Figure 3:
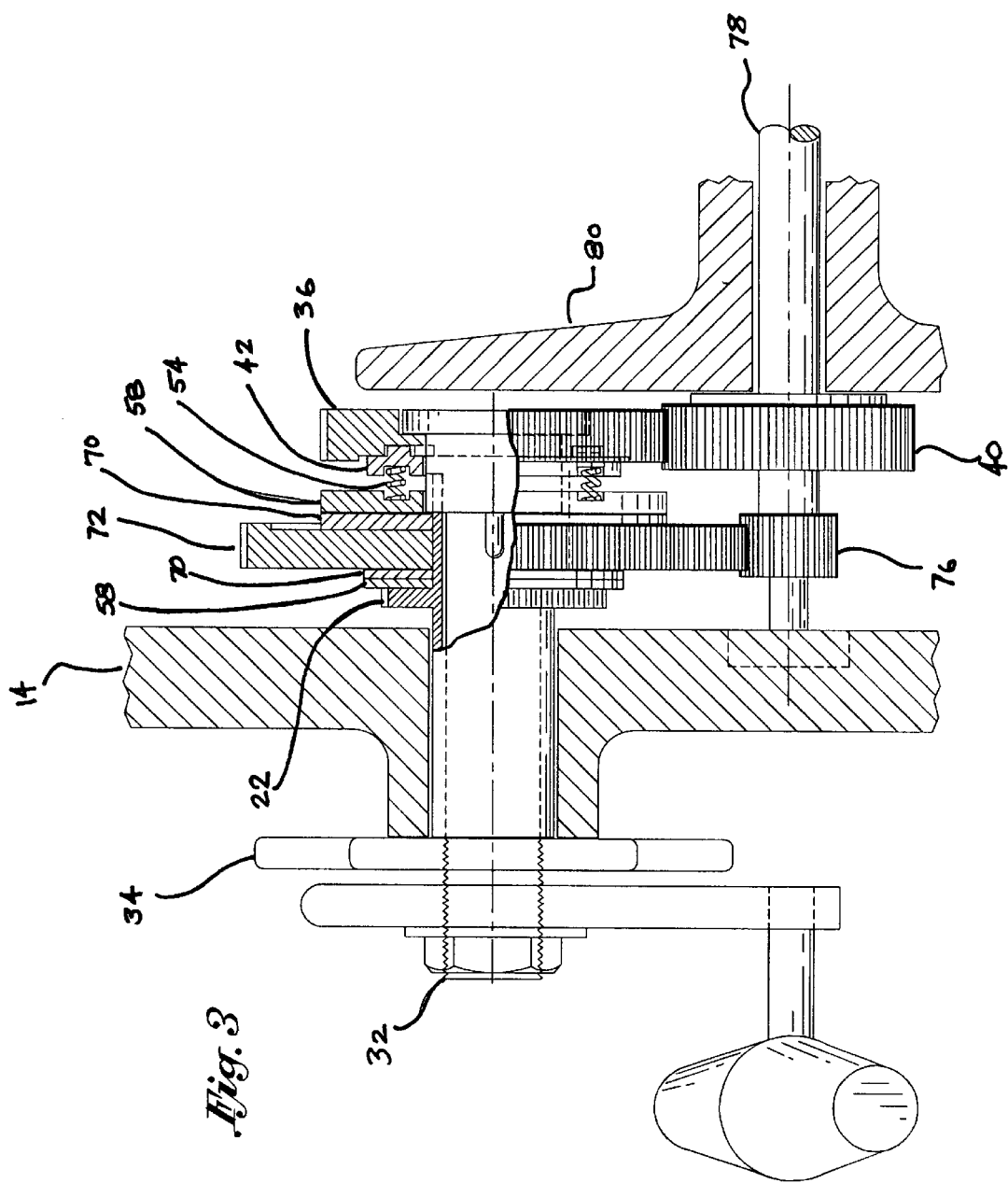
FIG. 3 is a fragmentary sectional view taken along line 3—3 of FIG. 1, illustrating the arrangement of the automatic two-speed transmission with the low gear driver engaged so that the low gear is driving the spool.

FIG. 1 illustrates a lever drag fishing reel incorporating the automatic two-speed transmission of the present invention. Although adaptable for use in conventional star drag fishing reel, the present invention is disclosed according to its incorporation into a lever drag fishing reel. As indicated above, the automatic two-speed transmission differs from existing two-speed fishing reel transmissions in that it does not require manual shifting by the operator to change from a high speed gear ratio to a low speed gear ratio. The automatic two-speed transmission will automatically shift into high speed gear ratio, the configuration of which is shown in FIG. 2, when tension on the line is low. High speed gear ratios are desired when tension on the line is low, such as when trolling or reeling in lures or bait through the water. The automatic two-speed transmission will automatically shift into low speed gear ratio, the configuration of which is shown in FIG. 3, when fishing line tension exceeds a predetermined setting.

Low speed gear ratios are desired when tension on the fishing line is high so that a high mechanical advantage is provided to the user such as when fighting or reeling in a large fish. Automatic shifting from low gear back to high gear is also important to prevent slack from developing in the line should the fish turn and run toward the angler, creating the risk that the fish might break the line due to the water resistance on the line as it is dragged through the water. Automatic shifting, without resorting to manual gear selection, is additionally important if an angler is holding the fishing rod with one hand and turning the fishing reel crank handle with the other while fighting a large fish. It is recognized herein that the present automatic two-speed transmission may be utilized with star drag fishing reels other than the lever drag fishing reel type into which the present invention is incorporated.

Referring more particularly now to FIGS. 1 and 2, the automatic two-speed transmission of the present invention includes a reel frame side plate 14 fixedly connected to a reel frame 12, a transmission assembly 16 adapted to drive a spool 80, which is rotatably mounted on a spool shaft 78. The transmission comprises a drive shaft 18 that is carried by the reel frame side plate 14, the drive shaft 18 having a distal end 18a passing axially through the side plate 14, and a proximal end 18b extending into the interior of the side plate 14.

Referring now to FIGS. 2, 3, 4 and 5, a crank handle 20 is non-rotatably connected to the distal end 18a of the drive shaft 18 with a drive sleeve 22 axially and slidably carried on the proximal end 18b of the drive shaft 18. The drive sleeve 22 is non-rotatably fixed on the drive shaft 18 by a pair of diametrically disposed slots 66, the slots 66 mating with a pair of pins 30 disposed on the proximal end 18b of the drive shaft 18. However, it will be recognized by one of ordinary skill in the art that other shapes, sizes, configurations and geometries for non-rotatably fixing the drive sleeve 22 to the drive shaft 18 may suffice. For example, the slots 66 in the drive sleeve 22 may mate with bosses that are integral with the drive shaft 18. Optionally, set screws disposed on the proximal end 18b of the drive shaft 18 for mating with the slots 66 in the drive sleeve 22 may also be workable.

Figure 4:
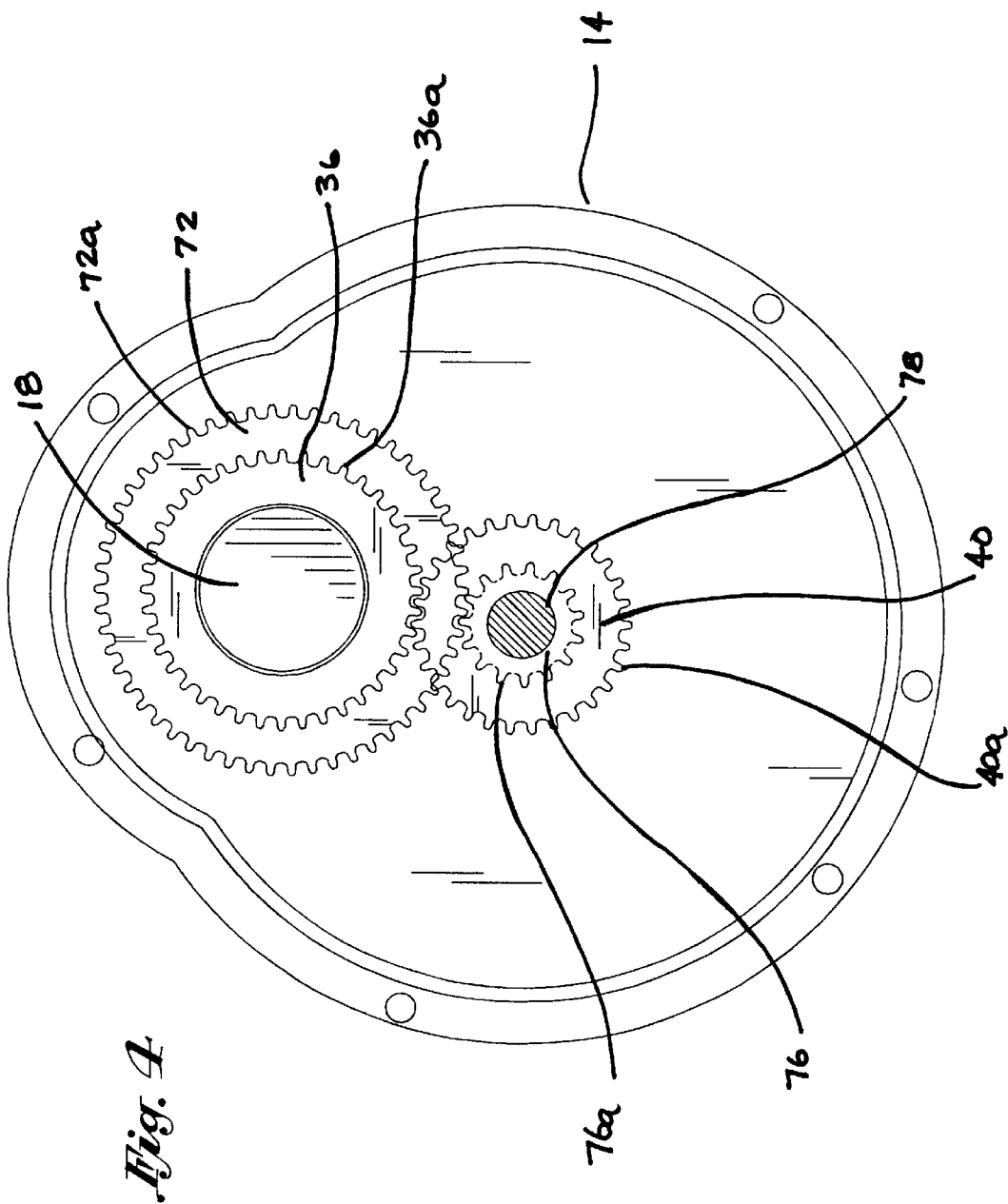
FIG. 4 is a sectional view taken along line 4—4 of FIG. 2 looking axially at the general arrangement of the automatic two-speed transmission of the present invention.

Referring to FIGS. 4 and 5, a low gear 36 is freely rotatable on a shoulder 26 of the drive shaft 18, a radial flange 24 at the proximal end 18b of the drive shaft 18 providing bearing support for the low gear 36. The low gear 36 drives a low pinion gear 40 by the meshing of low gear teeth 36a with low pinion gear teeth 40a, the low pinion gear 40 fixedly connected to the spool shaft 78, which is journaled into the reel side plate 14 and disposed parallel to the drive shaft 18.

Referring now to FIGS. 2 and 5, a low gear driver 42 is slidably disposed on the proximal end 18b of the drive shaft 18 and non-rotatably carried thereon by the interengagement of a pair of low gear driver flats 44 with a pair of drive shaft flats 28. However, a person of ordinary skill in the art will recognize that there are a number of arrangements that can substantially accommodate the slidable fixing of the low gear driver 42 to the drive shaft 18. For example, the drive shaft 18 may include an axially disposed rib that mates with a complementary notch in the low gear driver 42 for non-rotatably fixing the low gear driver 42.

As illustrated in FIGS. 6, 7, 8, and 9, it can be seen that the low gear driver 42 has at least six posts 46 for engaging an equal number of arcuate mating cavities 50 disposed on the low gear 36 enabling rotation of the low gear 36, the arcuate mating cavities 50 of the low gear 36 having ramps 52 disposed at an angle approximately equal to the angle of a chamfer 48 disposed on the end of each post 46. The combination of the chamfer 48 and the ramp 52 allow the low gear driver 42 to disengage the low gear 36 when the low gear 36 rotates at a speed greater than that of the drive shaft 18. Optionally, the low gear driver 42 may have three posts 46 for engaging three arcuate mating cavities 50 in the low gear 36, for example. However, it will be recognized by a person of ordinary skill in the art that other configurations and geometries such as a single cone spring that can substantially provide the engagement and disengagement characteristics of the low gear driver 42 with the low gear 36 may suffice.

Referring to FIG. 5, slidably carried on the drive sleeve 22 is a pair of clutch washers 58. The clutch washers 58 are non-rotatably fixed by the interengagement of clutch washer flats 62 with drive sleeve flats 64 with one of the pair of clutch washers 58 located adjacent to an anti-reverse gear 68. Although not mandatory, the antireverse gear 68 provides bearing support for the clutch washer 58. The anti-reverse gear 68 is fixedly connected to the drive sleeve 22, preventing the transmission from rotating in a rearward direction. However, one of ordinary skill in the art will recognize that the clutch washers 58 may be axially slidably attached to the drive sleeve 22 by any configuration substantially capable of preventing the rotation of the clutch washers 58. The other of the pair of clutch washers 58 is located adjacent the low gear driver 42 and it has at least three spring cavities 60 spaced equally about the circumference.

The low gear driver 42 has an equal number of spring bores 56 positioned complementary to the spring cavities 60 for accommodating a set of springs 54 for biasing the low gear driver 42 towards the low gear 36. One of ordinary skill in the art will recognize that the springs 54 may be coil springs or conical springs. Alternatively, a single coil spring disposed concentric with the drive shaft 18 and interposed between the low gear driver 42 and the clutch washer may also be workable. The biasing force of the springs 54 allows the posts 46 of the low gear driver 42 to engage the arcuate mating cavities 50 of the low gear 36 only when the low gear 36 is rotating slower than the drive shaft 18 while the posts 46 and mating cavities 50 are aligned.

As illustrated in FIGS. 3, 4 and 5, adjacent the low gear 36 is a high gear 72 having a diameter greater than that of the low gear 36 and freely rotatable and slidably carried on the drive sleeve 22, the high gear 72 disposed between the pair of clutch washers 58. The high gear 72 has high gear teeth 72a for driving a high pinion gear 76 by meshing of the high pinion gear teeth 76a with the high gear teeth 72a, as illustrated in FIG. 4. The high pinion gear 76 is fixedly connected to the spool shaft 78, which as mentioned above, is journaled into the reel side plate 14 and disposed parallel to the drive shaft 18.

A pair of annular clutch discs 70 are mounted on the drive sleeve and disposed on the sides of the high gear 72, the clutch discs 70 providing frictional resistance against the high gear 72 in order to engage the high gear 72. One of ordinary skill in the art will recognize that in an alternate configuration, the annular clutch discs 70 may be omitted altogether with the clutch washers 58 alone providing frictional resistance against the high gear 72 in order to engage the high gear 72. Additionally, the engaging surfaces of the annular clutch washers 58 and high gear 72 may be sized and configured to provide a higher coefficient of friction with the high gear 72.

Threadably attached to the threaded portion 32 of the distal end 18a of the drive shaft 18 is a tension preset wheel 34. The tension preset wheel 34 moves the drive sleeve 22 and the drive shaft 18 axially relative to each other in order to squeeze the high gear 72 between the clutch washers 58. Although the figures specifically show the tension preset wheel 34 as threadably attached, it will be recognized by one of ordinary skill in the art that any tension preset device that can substantially provide a predetermined compression load between the clutch washers 58 and the high gear 72 may be workable.

In operation, under conditions of no resistance on the fishing line, the clutch discs 70 and clutch washers 58 apply frictional force to the high gear 72 so that the high gear 72 is driven frictionally by rotation of the drive shaft 18. This in turn causes the high pinion gear 76 to rotate the spool 80 in a forward direction to reel in line at a high rate of speed at low resistance. In this condition, illustrated in FIG. 2, where the transmission is in the high gear 72, the low pinion gear 40 causes the low gear 36 to rotate at a speed greater than that of the drive shaft 18 and low gear driver 42, prohibiting the low gear driver 42 from engaging the low gear 36.

Under conditions where resistance is applied to the fishing line at a force greater than the clutch frictional resistance exerted on the high gear 72 by the clutch discs 70 and clutch washers 58, such as when reeling in a large fish, the high gear 72 slips, losing its ability to drive the spool 80. As the high gear 72 slips, the rotation of the high pinion gear 76 and low pinion gear 40 slows, allowing the drive shaft 18 and low gear driver 42 to match the rotational speed of the low gear 36. When the rotational speed of the low gear driver 42 matches or exceeds the rotational speed of the low gear 36, the low gear driver 42 engages the low gear 36, as illustrated in FIG. 3. This in turn drives the low pinion gear 40 and spool 80 of the reel 10, providing the user with a high mechanical advantage at the crank handle 20.

However, when the transmission is in low gear 36, the resistance to the fishing line may be suddenly reduced, such as when the fish moves toward the user, causing the line to slacken. In this condition, again illustrated in FIG. 2, the frictional resistance of the clutch discs 70 and clutch washers 58 against the high gear 72 is greater than the resistance applied to the fishing line, allowing the high gear 72 to resume driving the high pinion gear 76, the low gear driver 42 disengaging from the low gear 36, thereby allowing the user to again reel in line at a high rate of speed. The tension preset wheel 34 is adjustable to regulate the point at which the transmission assembly 16 shifts from the high gear 72 to the low gear 36 and from the low gear 36 to the high gear 72.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An automatic two-speed transmission for a fishing reel, comprising:
    a drive shaft;
    a low gear rotatably carried on the drive shaft;
    a low gear driver non-rotatably carried on the drive shaft for engaging the low gear when the low gear rotates at a speed less than the drive shaft, the low gear driver disengaging from the low gear when the low gear rotates at a speed greater than the drive shaft;
    a high gear rotatable on the drive sleeve; and
    a pair of clutch washers non-rotatably fixed to the drive sleeve and disposed on either side of the high gear, the clutch washers frictionally engaging the high gear when the rotational force on the high gear is lower than the frictional force of the clutch washers on the high gear.

2. The automatic two-speed transmission of claim 1, wherein the drive shaft is supported by a reel side plate.

3. The automatic two-speed transmission of claim 2, wherein the drive shaft includes a distal end and a proximal end, the distal end passing axially through to the exterior of the reel side plate, the proximal end extending into the interior portion of the reel side plate.

4. The automatic two-speed transmission of claim 3, wherein the low gear is freely rotatable on a shoulder of the drive shaft and bearingly supported by a radial flange at the proximal end of the drive shaft, the low gear engaging a low pinion gear, the low pinion gear fixedly connected to a spool shaft, the spool shaft journaled into the reel side plate and disposed parallel to the drive shaft.

5. The automatic two-speed transmission of claim 3, wherein the low gear driver is non-rotatably and slidably carried on the proximal end of the drive shaft by the interengagement of a pair of low gear driver flats with a pair of low gear flats, the low gear driver having at least one post for engaging an equal number of arcuate mating cavities disposed on the low gear.

6. The automatic two-speed transmission of claim 3, wherein the high gear has a diameter greater than that of the low gear and is freely rotatable and slidably carried on the drive sleeve, the high gear engaging a high pinion gear, the high pinion gear fixedly connected to the spool shaft.

7. The automatic two-speed transmission of claim 1, wherein the engaging surfaces of the clutch washers and the high gear are sized and configured to provide a higher coefficient of friction with the high gear.

8. The automatic two-speed transmission of claim 1, further comprising:
    a crank handle fixedly connected to the drive shaft for rotating the drive shaft.

9. An automatic two-speed transmission for a fishing reel including a reel side plate fixedly connected to a reel frame and including a spool rotatably mounted on a spool shaft, the automatic two-speed transmission comprising:
    a drive shaft supported by the reel side plate;
    a drive sleeve axially slidable and non-rotatably fixed to the drive shaft by a pair of diametrically disposed slots, the slots mating with a pair of pins disposed on the proximal end of the drive shaft;

a low gear rotatably carried on the drive shaft;

a low gear driver biased toward the low gear and non-rotatably carried on the drive shaft for engaging the low gear when the low gear rotates at a speed less than the drive shaft, the low gear driver disengaging from the low gear when the low gear rotates at a speed greater than the drive shaft;

a high gear rotatable on the drive sleeve;

a pair of clutch washers axially slidable and non-rotatably mounted to the drive sleeve and disposed on either side of the high gear, the clutch washers frictionally engaging the high gear when the rotational force on the high gear is lower than the frictional force of the clutch washers on the high gear; and a tension preset device attached to the drive shaft, the tension preset device moving the drive sleeve and the drive shaft axially relative to each other to adjust the frictional force between the high gear and the clutch washers in order to regulate the point at which the transmission assembly shifts from the high gear to the low gear and from the low gear to the high gear.

10. The automatic two-speed transmission of claim 9, further comprising:

a pair of annular clutch discs rotatably mounted on the drive sleeve and disposed on either side of the high gear between the clutch washers and the high gear, the clutch discs providing frictional resistance against the high gear and the clutch washers in order to engage the high gear.

11. The automatic two-speed transmission of claim 9, wherein the drive shaft includes a distal end and a proximal end, the distal end passing axially through to the exterior of the reel side plate, the proximal end extending into the interior portion of the reel side plate.

12. The automatic two-speed transmission of claim 11, wherein the low gear is rotatable on a shoulder of the drive shaft and bearingly supported by a radial flange at the proximal end of the drive shaft, the low gear engaging a low pinion gear, the low pinion gear fixedly connected to the spool shaft, the spool shaft journaled into the reel side plate and disposed parallel to the drive shaft.

13. The automatic two-speed transmission of claim 11, wherein the low gear driver is non-rotatably and slidably carried on the proximal end of the drive shaft by the interengagement of a pair of low gear driver flats with a pair of low gear flats, the low gear driver having at least one post for engaging an equal number of arcuate mating cavities disposed on the low gear.

14. The automatic two-speed transmission of claim 9, wherein the low gear driver has an equal number of spring bores positioned complementary to the spring cavities for accommodating a set of springs for biasing the low gear driver toward the low gear, the biasing of the springs allowing the posts of the low gear driver to engage the arcuate mating grooves of the low gear when the low gear is rotating slower than the drive shaft while the posts and mating grooves are aligned.

15. The automatic two-speed transmission of claim 9, wherein the low gear driver has a plurality of posts for engaging an equal number of arcuate mating cavities disposed on the low gear.

16. The automatic two-speed transmission of claim 9, wherein the high gear has a diameter greater than that of the low gear and is freely rotatable and slidably carried on the drive sleeve, the high gear engaging a high pinion gear, the high pinion gear fixedly connected to the spool shaft.

17. The automatic two-speed transmission of claim 9, wherein the engaging surfaces of the clutch washers and the high gear are sized and configured to provide a higher coefficient of friction with the high gear.

18. The automatic two-speed transmission of claim 9, further comprising:

a crank handle fixedly connected to the drive shaft for rotating the drive shaft.

19. The automatic two-speed transmission of claim 11, wherein the slots in the drive sleeve mate with an equal number of bosses integral to and disposed on the proximal end of the drive shaft.

20. The automatic two-speed transmission of claim 11, wherein the, the slots in the drive sleeve mate with an equal number of set screws disposed on the proximal end of the drive shaft.

21. The automatic two-speed transmission of claim 14, wherein the springs are coil springs.

22. The automatic two-speed transmission of claim 14, wherein the springs are conical springs.

23. The automatic two-speed transmission of claim 9, wherein a single coil spring is interposed between the clutch washer and the low gear driver for biasing the low gear driver toward the low gear.

24. An automatic two-speed transmission for a lever-type fishing reel including a reel side plate fixedly connected to a reel frame and including a spool rotatably mounted on a spool shaft, the automatic two-speed transmission comprising:

a drive shaft rotatably carried by the reel side plate, the drive shaft having a distal end and a proximal end, the distal end passing axially through to the exterior of the reel side plate, the proximal end extending into the interior portion of the reel side plate;

a crank handle non-rotatably connected to the distal end of the drive shaft for rotation thereof;

a drive sleeve axially slidably carried on the proximal end of the drive shaft and non-rotatably fixed thereto by a pair of diametrically disposed slots, the slots mating with a pair of pins disposed on the proximal end of the drive shaft;

a low gear freely rotatable on a shoulder of the drive shaft and bearingly supported by a radial flange at the proximal end of the drive shaft, the low gear having low gear teeth for driving a low pinion gear by the meshing of the low gear teeth with the low pinion gear teeth, the low pinion gear fixedly connected to the spool shaft, the spool shaft journaled into the reel side plate and disposed parallel to the drive shaft;

a low gear driver slidable on the proximal end of the drive shaft and non-rotatably carried thereon by the interengagement of a pair of low gear driver flats with a pair of low gear flats, the low gear driver having at least one post for engaging one of any number of arcuate mating cavities disposed on the low gear enabling rotation of the low gear, the arcuate mating cavities of the low gear having ramps disposed at an angle approximately equal to the angle of a chamfer disposed on the end of each post to allow the low gear driver to disengage the low gear when the low gear rotates at a speed greater than that of the drive shaft;

a pair of clutch washers non-rotatably and slidably carried on the drive sleeve by the interengagement of clutch washer flats with the drive sleeve flats, one of the pair of clutch washers located adjacent to and bearingly supported by an anti-reverse gear, the anti-reverse gear fixedly connected to the drive sleeve, the other of the pair of clutch washers located adjacent the low gear driver and having at least one spring cavities spaced equally about the circumference, the low gear driver having an equal number of spring bores positioned complementary to the spring cavities for accommodating a set of springs for biasing the low gear driver toward the low gear, the biasing of the springs allowing the posts of the low gear driver to engage the arcuate mating grooves of the low gear only when the low gear is rotating slower than the drive shaft while the posts and mating grooves are aligned;

a high gear having a diameter greater than that of the low gear and freely rotatable and slidably carried on the drive sleeve, the high gear disposed between the pair of clutch washers, the high gear having high gear teeth for driving a high pinion gear by meshing of the high pinion gear teeth with the high gear teeth, the high pinion gear fixedly connected to the spool shaft;

a pair of annular clutch discs mounted on the drive sleeve and disposed on either side of the high gear, the clutch discs providing frictional resistance against the high gear in order to engage the high gear; and a tension preset wheel threadably attached to a threaded portion of the drive shaft, the tension preset wheel moving the drive sleeve and the drive shaft axially relative to each other to squeeze the high gear between the clutch washers, the clutch discs applying frictional force thereto so that the high gear is driven frictionally by rotation of the drive shaft in a forward direction to reel in line at a high rate of speed at low resistance, the low gear driver engaging the low gear and enabling rotation of the low gear in a forward direction when resistance applied to the spool is greater than the clutch friction resistance allowing the user to reel in line at a low rate of speed at high resistance, the tension preset wheel adjustable to regulate the point at which the transmission assembly shifts from high gear to low gear and from low gear to high gear.

25. The automatic two-speed transmission of claim 24, wherein the clutch discs are sized and configured to provide a higher coefficient of friction with the clutch washers and the high gear.

26. The automatic two-speed transmission of claim 25, wherein the clutch discs are constructed of carbon fiber.

\* \* \* \* \*